United States Patent [19]

Bönigk

[11] Patent Number: 5,713,601
[45] Date of Patent: Feb. 3, 1998

[54] LOW-FLAMMABILITY SAFETY BELTS CONTAINING PHOSPHORUS-MODIFIED POLYESTER FIBERS AND USE OF THESE POLYESTER FIBERS FOR MANUFACTURING SAFETY BELTS

[75] Inventor: Burkhard Bönigk, Königsbrunn, Germany

[73] Assignee: Hoechst Trevira GmbH & Co KG, Germany

[21] Appl. No.: 729,179

[22] Filed: Oct. 11, 1996

[30] Foreign Application Priority Data

Oct. 11, 1995 [DE] Germany .................. 195 37 700.1
Mar. 11, 1996 [DE] Germany .................. 196 09 334.1

[51] Int. Cl.$^6$ .................. B60R 22/00; D03D 23/00; D02G 3/00
[52] U.S. Cl. .................. 280/801.1; 139/383 R; 428/357
[58] Field of Search .................. 428/357, 364; 528/167; 182/3; 180/268; 280/802, 801.1; 289/464; 442/203; 139/426 R, 383 R

[56] References Cited

U.S. PATENT DOCUMENTS 4,210,740  7/1980  Couchound .................. 528/167

FOREIGN PATENT DOCUMENTS 0 661 393  5/1995  European Pat. Off. .

OTHER PUBLICATIONS

Database WPI Section Ch, Week 9534 Derwent Publications Ltd. & JP 07 166 422 (A Kuraray Co Ltd), Jun. 27, 1995.

Database WPI Section Ch, Week 9135 Derwent Publications Ltd., London, GB & JP 03 167 312 A (Toray Ind Inc), Jul. 19, 1991.

Database WPI Section Ch, Week 9026 Derwent Publications Ltd., London, GB & JP 02 127 517 A (Toray Ind Inc), May 16, 1990.

*Primary Examiner*—Newton Edwards
*Attorney, Agent, or Firm*—Connolly & Hutz

[57] ABSTRACT

A safety belt is made of a fabric of high-tenacity filament yarns made of phosphorus-modified copolyester having a yarn linear density of less than 2000 dtex, having a single-fiber linear density of less than or equal to 25 dtex and having a breaking elongation of less than 30%. The phosphorus-modified copolyester contains a bifunctional phosphorus compound in an amount of 0.1% to 5% by weight, based on the amount of phosphorus, in the polymer chain.

16 Claims, No Drawings

5,713,601

LOW-FLAMMABILITY SAFETY BELTS CONTAINING PHOSPHORUS-MODIFIED POLYESTER FIBERS AND USE OF THESE POLYESTER FIBERS FOR MANUFACTURING SAFETY BELTS

BACKGROUND OF THE INVENTION

Low-flammability safety belts containing phosphorus-modified polyester fibers and use of these polyester fibers for manufacturing safety belts.

The present invention relates to safety belts which are low-flammable owing to the use of phosphorus-modified polyester fibers.

In recent years, safety belts have become a standard component of modern vehicles, in particular motor vehicles. Owing to increased safety requirements, the number of safety belts used in a vehicle has increased considerably.

Vehicles in the context of this description are taken to mean all types of land vehicles, water craft and aircraft.

Safety belts are principally manufactured from fabrics which consist essentially of high-tenacity polyester fibers.

In the development of textile safety components for the automobile, strength is of major importance. However, in the event of an accident, the safety belt remains in the interior of the vehicle as relatively large surface areas of textile. In the event of fire, this represents a hazard to the occupants similar to curtains in the residential area.

The topic of low-flammability safety belts went long unconsidered. JP-A-07-166,422 proposes polyester yarns containing phosphorus compounds which are also suitable, inter alia, for manufacturing safety belts. The previously known yarns contain coarse-grain particles of 1 to 100 μm, which must be termed very large in comparison to typical fiber diameters, such as about 30 μm. These particles can lead to a sawing effect, particularly at concentrations of up to 5% by weight. In addition, these fibers have very high breaking elongations, at more than 30%.

JP-A-91-167,312 discloses low-flammability polyester fibers for manufacturing fabrics, which themselves are suitable for manufacturing airbags. The disclosure in this publication only describes airbags made of coated fabrics. No suggestion of using fabrics of this type for manufacturing safety belts can be found in the publication.

In view of the increasing safety requirements in vehicles, there is a need for low-flammability safety belts, in particular to minimize the risk of fire present in accidents and the associated hazard to the vehicle occupants.

SUMMARY OF THE INVENTION

It is therefore the object of the present invention to provide yarns and fabrics for safety belts which have the necessary safety properties of known yarns and fabrics but also have flame-retardant properties.

It has now surprisingly been found that low-flammability safety belts may be manufactured by using low-flammability and phosphorus-modified polyester filaments.

DETAILED DESCRIPTION OF THE INVENTION

The invention provides safety belts comprising a fabric which comprises high-tenacity filament yarns made of phosphorus-modified copolyester having a yarn linear density of less than 2000 dtex, having an individual filament linear density of less than or equal to 25 dtex and having a breaking elongation of less than 30%, the phosphorus-modified copolyester comprising a bifunctional phosphorus compound in an amount of 0.1 to 5% by weight, preferably 0.2 to 0.8% by weight, based on the amount of phosphorus, in the polymer chain.

The safety belts of the invention can comprise a relatively small proportion, or can consist completely, of the above defined high-tenacity and phosphorus-modified filament yarns. Thus, it is possible, for example, to make up only one of the thread systems making up the safety belts of the invention entirely or only partly from these yarns. Those skilled in the art can determine, on the basis of routine experiments, the amount necessary in the individual case of the above defined high-tenacity and phosphorus-modified filament yarns, for example taking as a basis the desired strength of the fabric.

Use of the phosphorus-modified polyester fibers lowers the flammability of the fabrics manufactured therefrom. Low-flammability fabric in the context of this description is taken to mean a loomstate fabric which has, in the flammability testing as specified in DIN 4102/B2, a total burning time which is shorter by at least the factor 5, preferably by the factor 10, than that of a comparable loomstate fabric of non-phosphorus-modified polyester and which does not afterburn after a flame is applied for 3 and 15 seconds as specified in DIN 54336 or for 3 seconds as specified in DIN 54333.

In addition to the above high-tenacity and phosphorus-modified filament yarns, some of the yarns used in the safety belts of the invention can comprise non-phosphorus-modified and high-tenacity filament yarns.

Preferably, at least one direction, e.g. the weft direction on the warp direction, of the fabric is made up completely of the above defined high-tenacity and phosphorus-modified filament yarns, particularly preferably both directions are made up of filament yarns of this type.

The safety belts of the invention can consist of fabrics comprising two or more thread systems; preferably, two thread systems are provided (warp and weft yarn sheets).

Very particularly preferably, fabrics are used which consist of at least two thread systems, each of which consists at least 90% of the above defined high-tenacity and phosphorus-modified filament yarns.

Particular preference is given to safety belts as defined above whose high-tenacity filament yarns have a tenacity of more than 60 cN/tex, preferably of more than 65 cN/tex, and a breaking elongation of 10 to 25%.

The breaking force and the breaking elongation of the polyester yarns used were measured as described in DIN 53 83 Part 1.

Particular preference is given to safety belts, as defined above, whose high-tenacity filament yarns have a hot-air shrinkage of less than 20% at 200° C.

The heat shrinkage (hot-air shrinkage) of the polyester yarns used is measured as described in DIN 53 866 Part 3, at a temperature of 200° C. on free-hanging yarn samples with a treatment time of 15 minutes. 10 m hanks at a reel tension of 0.5 cN/tex are used.

A further particularly preferred embodiment relates to safety belts, as defined above, whose fabric, in addition to high-tenacity filament yarns of phosphorus-modified copolyester, comprises monofilaments having a diameter of less than or equal to 0.5 mm, the monofilaments comprising phosphorus-modified copolyester which contains a bifunctional phosphorus compound in an amount of 0.1 to 5% by weight, preferably 0.2 to 0.8% by weight, based on the amount of phosphorus, in the polymer chain.

The monofilaments give the safety belt an enhanced high elastic transverse stiffness; this prevents twisting of the safety belt.

In a further preferred embodiment of the safety belt of the invention, monofilaments are used which have a tenacity of more than 35 cN/tex and a breaking elongation of more than 15% and/or which have a hot-air shrinkage at 180° C. of less than 20%.

Very particularly preferably, fabrics are used which comprise high-tenacity filament yarns which are size-free and made of phosphorus-modified copolyester.

The uncoated fabrics of the invention can have different weaves, preferably a twill weave, in particular a 2/2 twill weave, or a rep weave. Fabrics having these weaves are known per se.

The safety belts of the invention preferably comprise fabric having a mass per unit area of less than 100 g per running meter at 50 mm width and a fabric thickness of less than 1.5 mm.

A particularly preferred fabric has a breaking force of more than 1470 daN at 50 mm width and a 1000 N EASL of less than 20% at 50 mm width, both measure as specified in DIN 53 857 Part 1.

The high-tenacity filament yarns used according to the invention comprise polyester filaments which are made up of a phosphorus-modified copolyester.

The copolyester can be any type of spinnable copolymer having repeating ester groups, provided it contains in the polymer chain a bifunctional phosphorus compound in the amount specified above.

Preferably, high-tenacity filaments of phosphorus-modified copolyesters are used which contain the repeating structural units of the formula I

—O—OC—Ar¹—CO—O—R¹—     (I), and which have components of the formula II in the polymer chain

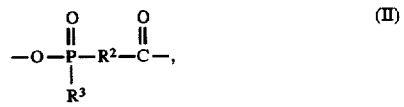

in which Ar¹ is a divalent aromatic radical,

R¹ is a divalent aliphatic or cycloaliphatic radical,

R² is a divalent aliphatic, cycloaliphatic, aromatic or araliphatic radical, and R³ is a monovalent aliphatic, cycloaliphatic, aromatic or araliphatic radical.

Particularly preferably, modified polyesters of the above indicated type are used in which Ar¹ is phenylene or naphthylene, in particular 1,4-phenylene or 2,6-naphthylene.

Likewise particularly preferably, polyesters of the above indicated type are used in which R¹ is a radical of the formula —$C_nH_{2n}$—, in which n is an integer between 2 and 6, in particular ethylene, or a radical derived from cyclohexanedimethanol.

Likewise particularly preferably, modified polyesters of the above indicated type are used in which R² is a radical of the formula —$C_mH_{2m}$—, in which m is an integer between 2 and 10, or a cyclic alkanediyl radical having 4 to 8, preferably 6, carbon atoms, and R³ is $C_1$-$C_6$alkyl, cyclohexyl, phenyl, or benzyl.

If any radicals in the structural formulae defined above are divalent aliphatic radicals, this is to be understood as including branched and, in particular, straight-chain aklylene, for example alkylene having two to twenty, preferably two to eight, carbon atoms. Examples of radicals of this type are ethane-1,2-diyl, propane-1,3-diyl, butane-1,4-diyl, pentane-1,5-diyl, hexane-1,6-diyl or octane-1,8-diyl.

If any radicals in the structural formulae defined above are divalent cycloaliphatic radicals, this is to be understood as including groups which contain carbocylic radicals having 5 to 8, preferably 6, ring carbon atoms. Examples of radicals of this type are cyclohexane-1,4-diyl or the group —$CH_2$—$C_6H_{10}$—$CH_2$—.

If any radicals in the structural formulae defined above are divalent aromatic radicals, these are heterocyclic aromatic radicals, which can be mononuclear or polynuclear, or, in particular, mononuclear or polynuclear aromatic hydrocarbons. In the case of heterocyclic aromatic radicals, these have, in particular, one or two oxygen, nitrogen or sulfur atoms in the aromatic nucleus.

Polynuclear aromatic radicals can be condensed with one another or can be joined to one another via C—C bonds or via bridging groups, such as —O—, —S—, —CO— or —CO—NH— groups.

The valence bonds of the divalent aromatic radicals can be in the para or comparable coaxial or parallel position to one another, or else in the meta or comparable angled position to one another.

The valence bonds which are in coaxial position or a position parallel to one another are oriented in opposite directions. An example of coaxial bonds oriented in opposite directions are the biphenyl-4,4'-diyl bonds. An example of parallel bonds oriented in opposite directions are the 1,5-naphthylene or -2,6-naphthylene bonds, whereas the 1,8-naphthylene bonds are oriented in the same direction in parallel.

Examples of preferred divalent aromatic radicals whose valence bonds are in the para or comparable coaxial or parallel position to one another are mononuclear aromatic radicals having free valencies in the para position to one another, in particular 1,4-phenylene or dinuclear condensed aromatic radicals having parallel bonds oriented in opposite directions, in particular 1,4-, 1,5- and 2,6-naphthylene, or dinuclear aromatic radicals linked vai a C—C bond having coaxial bonds oriented in opposite directions, in particular 4,4'-biphenylene.

Examples of preferred divalent aromatic radicals whose valence bonds are in the meta or comparable angled position to one another are mononuclear aromatic radicals having free valencies in the meta position to one another, in particular 1,3-phenylene or dinuclear condensed aromatic radicals having bonds orientated at an angle to one another, in particulate 1,6- and 2,7-naphthylene, or dinuclear aromatic radicals linked via a C—C bond having bonds oriented at an angle to one another, in particular 3,4'-biphenylene.

If any radicals are divalent araliphatic radicals, this is to be understood as including groups which contain one or more divalent aromatic radicals which are combined with an alkylene radical via one or both valencies. A preferred example of a radical of this type is the group —$C_6H_4$—$CH_2$—.

If any radicals are monovalent aliphatic radicals, these are to be understood as including branched and, in particular, straight-chain alkyl, for example alkyl having one to six carbon atoms, in particular methyl.

If any radicals are monovalent cycloaliphatic radicals, these are to be understood as including groups which contain carbocylic radicals having five to eight, preferably six, ring carbon atoms. An example of a radical of this type is cyclohexyl.

If any radicals are monovalent aromatic radicals, these are heterocyclic aromatic radicals, which can be mononuclear or polynuclear, or, in particular, mononucluear or polynuclear aromatic hydrocarbon radicals.

In the case of heterocylic aromatic radicals, these have, in particular, one or two oxygen, nitrogen or sulfur atoms in the aromatic nucleus. An example of a radical of this type is phenyl or naphthyl.

If any radicals are monovalent araliphatic radicals, these are to be understood as including groups which contain one or more aromatic radicals which are combined with an alkylene radical via one valence. A preferred example of a radical of this type is the benzyl group.

All these aliphatic, cycloaliphatic, aromatic or araliphatic radicals can be substituted with inert groups. These are to be understood as including substituents which do not adversely affect the contemplated application.

Examples of such substituents are alkyl, alkoxy or halogen.

If any radicals are halogen, these are, for example, fluorine, bromine or, in particular, chlorine.

Particularly preferably, the filament yarns and/or monofilaments used according to the invention are filament yarns and/or monofilaments of phosphorus-modified poly (ethylene terephthalate).

The high-tenacity filament yarns or monofilaments used can be made up of modified polyesters which customarily have an intrinsic viscosity of at least 0.5 dl/g, preferably 0.6 to 1.5 dl/g. The intrinsic viscosity is measured in a solution of the polyester in dichloroacetic acid at 25° C. thread customarily have higher yarn linear densities in this case, for example between 1100 and 1700 dtex, than filament yarns which are used as weft threads, for example between 550 and 1100 dtex.

The single-fiber linear density of the filaments in the high-tenacity filament yarns used vary in the range of less than or equal to 25 dtex, preferably 4 to 20 dtex.

The cross sections of the filaments in the high-tenacity filament yarns or monofilaments used can be of any shape; for example elliptical, bilobal or multilobal, ribbon-like or, preferably, round.

The high-tenacity filament yarns used made of phosphorus-modified copolyesters are known per se, for example from EP-A-661,393, the description of which is also incorporated in the present description.

The phosphorus-modified copolyesters are prepared by processes known per se by polycondensation of the corresponding bifunctional monomer components, as is described, for example, in the abovementioned EP-A-661, 393.

The high-tenacity filaments can be produced by melt spinning processes known per se, such as are described, for example, in the abovementioned EP-A-661,393.

The fabrics making up the safety belts of the invention can be produced by weaving techniques known per se.

The thread counts of at least one of the thread systems of the fabrics used according to the invention are customarily at least 30 threads per centimeter, preferably at least 35 threads per centimeter, and particularly preferably at least 40 threads per centimeter.

The safety belts of the invention can comprise spun-dyed polyester fibers and/or can be subjected to a dyeing process known per se after the weaving. Polyester fibers of different colors can also be used.

If spun-dyed polyester fibers or polyester fibers furnished with delusterant, for example with titanium dioxide, are used, these polyester fibers preferably comprise particles having a means diameter of less than 1 μm, particularly preferably of less than 0.5 μm.

Examples of spun-dyed polyester fibers are carbon-black-dyed types.

The invention also relates to the use of the above defined phosphorus-modified fibers for manufacturing safety belts.

The safety belts of the invention are used, for example, in automobiles, but also in airplanes or other aircraft or in boats, in particular in motor boats in the leisure sector. The invention also relates to the use of the safety belts in these vehicles.

What is claimed is:

1. A safety belt comprising a fabric having a twill weave of high-tenacity filament yarns made of phosphorus-modified copolyester having a yarn linear density of less than 2000 dtex, an individual filament linear density of less than or equal to 25 dtex, a tenacity of more than 60 cN/tex and a breaking elongation of less than 30%, the phosphorus-modified copolyester having a polymer chain and containing a bifunctional phosphorus compound in an amount of 0.1 to 5% by weight, based on the amount of phosphorus, in the polymer chain.

2. The safety belt as claimed in claim 1, wherein the phosphorus-modified copolyester contains a bifunctional phosphorus compound in an amount of 0.2% to 0.8% by weight, based on the amount of phosphorus, in the polymer chain.

3. The safety belt as claimed in claim 1, wherein the fabric has at least two thread systems, each of each comprises at least 90% by weight of high-tenacity filament yarns made of phosphorus-modified copolyester.

4. The safety belt as claimed in claim 1, wherein the high-tenacity filament yarn has a tenacity of 65 cN/tex, and a breaking elongation of 10 bis 25%.

5. The safety belt as claimed in claim 1, wherein the high-tenacity filament yarn has a hot-air shrinkage at 200° C. of less than 20%.

6. The safety belt as claimed in claim 1, wherein, in addition to high-tenacity filament yarns made of phosphorus-modified copolyester, the fabric comprises monofilaments having a diameter of less than or equal to 0.5 mm, the monofilaments comprising phosphorus-modified copolyester which contains a bifunctional phosphorus compound in an amount of 0.1% to 5% by weight.

7. The safety belt as claimed in claim 6, wherein the monofilaments have a tenacity of more than 35 cN/tex and a breaking elongation of more than 15%.

8. The safety belt as claimed in claim 6, wherein the monofilament has a hot-air shrinkage at 180° C. of less than 20%.

9. The safety belt as claimed in claim 1, wherein the high-tenacity filament yarn is free of size.

10. The safety belt as claimed in claim 1, wherein the twill weave is a 2/2 twill weave.

11. The safety belt as claimed in claim 1, wherein its fabric has a mass per unit area of less than 100 g per running meter at 50 mm width and a fabric thickness of less than 1.5 mm.

12. The safety belt as claimed in claim 1, wherein its fabric has a breaking force of more than 1470 daN at 50 mm width and a 1000 N EASL (Elongation At Specific Load) of less than 20% at 50 mm width.

13. The safety belt as claimed in claim 1, wherein the phosphorus-modified copolyester contains the repeating structural units of the formula I

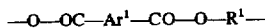 (I), and which has in the polymer chain components of the formula II

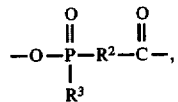 (II)

in which $Ar^1$ is a divalent mononuclear or polynuclear aromatic radical, $R^1$ is a divalent aliphatic or cycloaliphatic radical, $R^2$ is divalent aliphatic, cycloaliphatic, aromatic or araliphatic radical, and $R^3$ is monovalent aliphatic, cycloaliphatic, aromatic or araliphatic radical.

14. The safety belt as claimed in claim 13, wherein $Ar^1$ is phenylene or naphthylene.

15. The safety belt as claimed in claim 13, wherein $R^1$ is a radical of the formula $-C_nH_{2n}-$, in which n is an integer between 2 and 6, or is a radical derived from cyclohexanedimethanol.

16. The safety belt as claimed in claim 13, wherein $R^2$ is a radical of the formula $-C_mH_{2m}-$, in which m is an integer between 2 and 10, or is a cyclic alkanediyl radical having 4 to 8 carbon atoms, and $R^3$ is $C_1-C_6$alkyl, cyclohexyl, phenyl, or benzyl.

* * * * *

UNITED STATES PATENT AND TRADEMARK OFFICE
CERTIFICATE OF CORRECTION

PATENT NO. : 5,713,601
DATED : February 3, 1998
INVENTOR(S) : Burkhard Bonigk

It is certified that error appears in the above-identified patent and that said Letters Patent is hereby corrected as shown below:

Column 4, line 43, "vai" should read -- via --.

Column 5, line 33, "after "C." insert

--      The high-tenacity filament yarns used have yarn linear densities of less than 2000 dtex, preferably 280 to 1700 dtex. Filament yarns used as warp --.

Column 6, line 4, "means" should read -- mean --.

Column 6, line 31 (claim 3, line 2) "each"(second occurrence) should read -- which --.

Signed and Sealed this

Twelfth Day of May, 1998

Attest:

BRUCE LEHMAN

Attesting Officer

Commissioner of Patents and Trademarks